C. B. KIRKHAM.
AERONAUTICAL MOTOR.
APPLICATION FILED JULY 18, 1917.

1,370,692.

Patented Mar. 8, 1921.
5 SHEETS—SHEET 1.

Inventor
CHARLES B. KIRKHAM.
Attorney

C. B. KIRKHAM.
AERONAUTICAL MOTOR.
APPLICATION FILED JULY 18, 1917.

1,370,692.

Patented Mar. 8, 1921.
5 SHEETS—SHEET 2.

Inventor
CHARLES B. KIRKHAM.

By John P. Tarbox
Attorney

C. B. KIRKHAM.
AERONAUTICAL MOTOR.
APPLICATION FILED JULY 18, 1917.

1,370,692.

Patented Mar. 8, 1921.
5 SHEETS—SHEET 3.

Inventor
CHARLES B. KIRKHAM.
By John P. Tarbox
Attorney

C. B. KIRKHAM.
AERONAUTICAL MOTOR.
APPLICATION FILED JULY 18, 1917.

1,370,692.

Patented Mar. 8, 1921.
5 SHEETS—SHEET 5.

Inventor
CHARLES B. KIRKHAM.

By

Attorney

UNITED STATES PATENT OFFICE.

CHARLES B. KIRKHAM, OF BUFFALO, NEW YORK, ASSIGNOR TO CURTISS AEROPLANE AND MOTOR CORPORATION, A CORPORATION OF NEW YORK.

AERONAUTICAL MOTOR.

1,370,692.   Specification of Letters Patent.   Patented Mar. 8, 1921.

Application filed July 18, 1917. Serial No. 181,238.

*To all whom it may concern:*

Be it known that I, CHARLES B. KIRKHAM, a citizen of the United States, residing at Buffalo, in the county of Erie and State of New York, have invented certain new and useful Improvements in Aeronautical Motors, of which the following is a specification.

My invention relates to multiple cylinder internal combustion engines of the four cycle class and more particularly to that type of such engines which are adapted to be used in connection with aircraft. While of this particular adaptation and relation, however, it will be obvious upon an understanding of my invention that this application may be extended to other types and classes of engines without departing in any wise from its generic spirit.

The demands of aeronautical work during present day developments are very severe and require that the maximum power output be obtained with the minimum weight in the motor as well as in other parts. At the same time the efficiency, reliability, durability and flexibility of control must not be sacrificed in any way. Heretofore it has been proposed to use motors of steel construction and many of them have been built with the aim of attaining these ends through the use of alloy steels and other high grade materials giving the very maximum strength per unit of weight. But this has led to complexities, difficulties in construction and expense in manufacture without that full decrease in weight which might have been expected. Particularly has this been true in motors which have been constructed entirely of steel. Indeed the results have been heretofore only partially realized in motors in which the construction has been partly of steel and partly of some other metal, a metal of greater lightness and less strength, such as aluminum, being used in those parts in which only minor forces are developed or in which the construction itself can be made such as to attain the requisite strength without special reference to the material used. In the matter of my invention I have evolved a construction in which light and heavy, weak and strong, materials are combined to the realization of the aforesaid ends to a degree not heretofore attained by any construction known to the art.

Preliminary to an introduction of the structure of my invention, the principles upon which it is advanced are attained may be said briefly to be the use of steel or other high grade materials wherever conditions of durability cannot be met by a lighter material, or if they can be met the structural arrangement of the lighter material cannot, on account of lack of space or accumulation of weight, be made such as to give the necessary strength. I have further consolidated the functions of various parts to the elimination of the unnecessary, and still further attained directness of operation with a great resultant diminution in the total number of parts necessary.

According to my invention I form the outer walls of the cylinder, which outer walls constitute the water jacket, integrally with the main crank case casting and constitute these outer walls in and of themselves the means of attachment of the cylinder bodies proper to the crank case. The cylinder bodies which must stand the explosion strains and which must radiate sufficient heat to keep the metal of which they are constituted at a proper operating temperature, I form of one piece steel. The cylinder bodies I anchor in a valve cage structure which supports the valve mechanism and contains the exhaust and admission conduits and which is removably connected with the water jacket walls. Preferably I form these water jacket walls in bank inclosing commonly a multiple number of cylinder bodies and form a valve cage structure for the bank in one piece. Thus the jacket walls encompass the bank of cylinders. The strength of the connection of the cylinder bodies to the crank case is greatly multiplied through the cantaliver action of the common cage structure. The cylinders operate upon a common crank shaft located at the intersection of the plane of the cylinder banks. Above the crank shaft in the V between the cylinders is a stub driving shaft extending well back between the cylinders and geared to the crank shaft through a reducing train. Through radial spindles and a worm gear this stub shaft drives overhead crank shafts, the followers associated with which directly engage the valve stems. Similarly characterized valves are commonly yoked together by means of the followers themselves, and the followers are engaged at an intermediate point by the cams, the entire arrangement being such that the symmetry and directness of operation is attained.

There are many subordinate and detail features in my invention, all of which fully appear hereinafter.

In the accompanying drawings I show one embodiment of my invention, that which at the present time educes the inherent advantages of my invention to the greatest degree.

Figure 1:
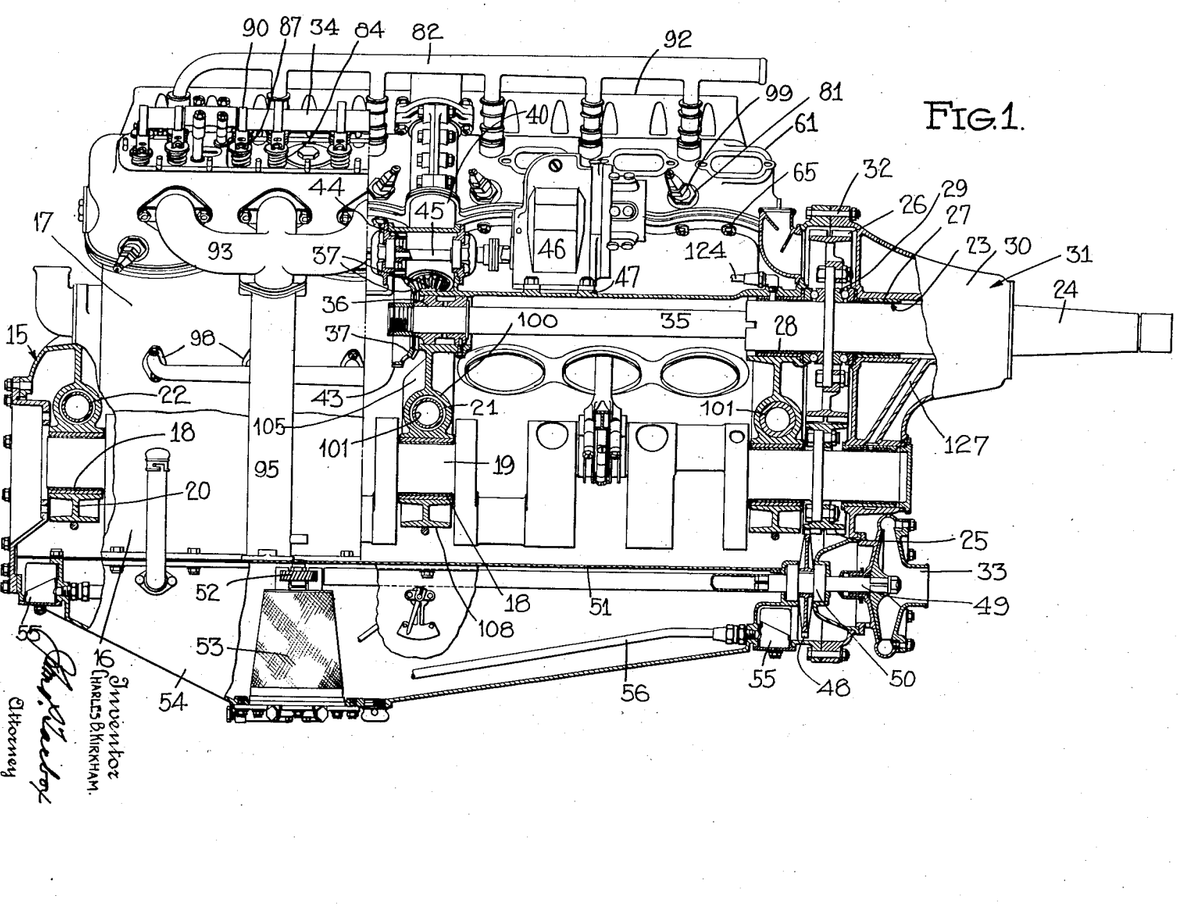
Figure 1 is a partial sectional side elevation of the motor.
Figures 2, 9, 10, 11:
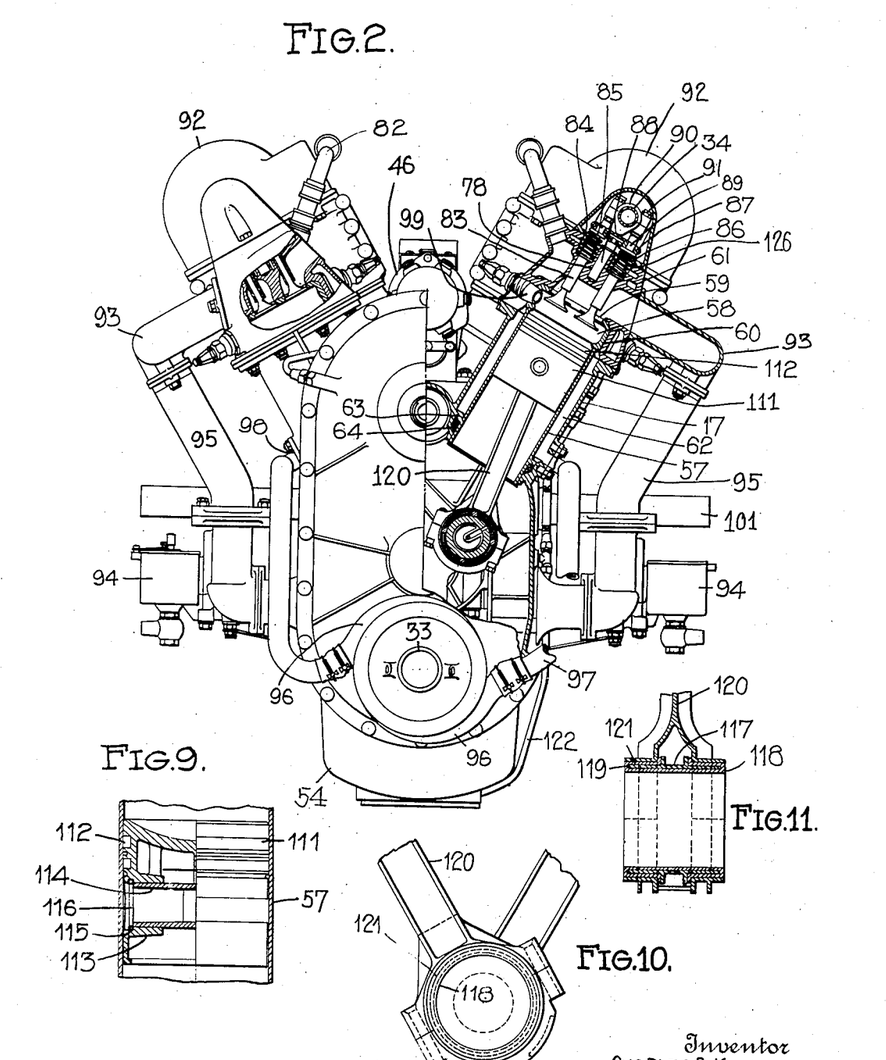
Fig. 2 is a partial sectional end elevation of the motor.
Fig. 9 is a partial section of a piston and piston pin.
Fig. 10 is a partial side view of a pair of connecting rods.
Fig. 11 is a sectional view of same.
Figure 3:
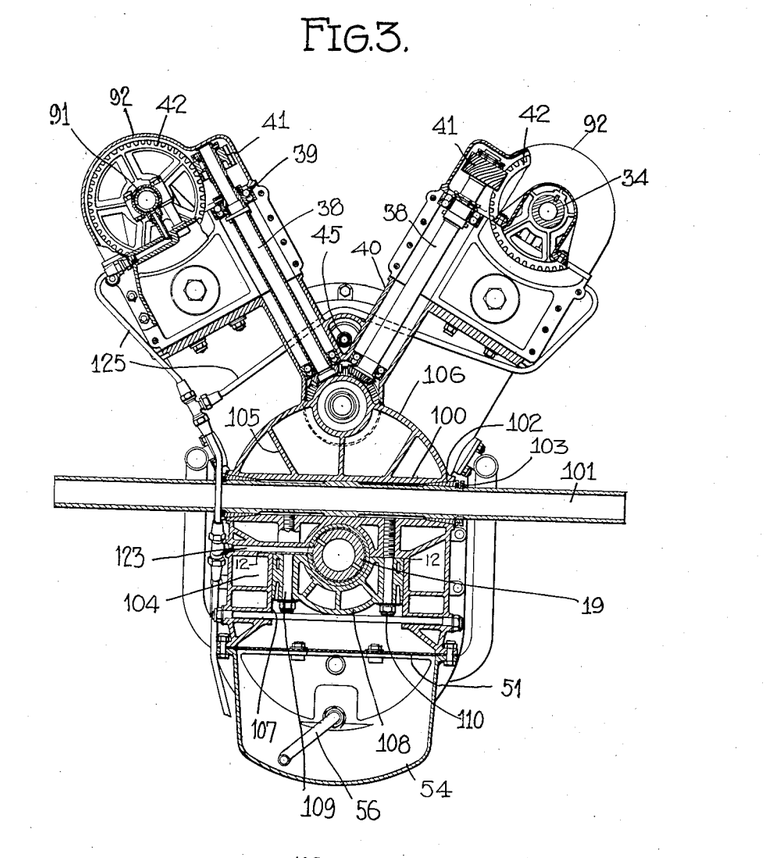
Fig. 3 is a transverse section in which is shown the interior arrangement of parts.

In Fig. 1 the upper crank case and cylinder casting is wholly designated as 15. This casting is composed of the upper crank case portion 16 and the outer walls of the two banks of cylinders 17 (Figs. 2 and 3). Integrally formed within the upper portion of the crank case 15 are the three bearings 18 which support the hollow crank shaft 19. These bearings 18 are supported by aluminum webbing 20 which is provided with a circular laterally extending opening 21 which is adapted to receive and retain the tubular steel motor supporting members 22 which pass through the crank case casting and extend to either side of the motor as shown in Fig. 2. This method of supporting the motor is very effective since it affords support at exactly those points which receive the maximum strains due to the motor operation and as will be seen reinforces the case. Referring again to Fig. 1, it will be seen that the forward portion of the upper crank case casting is provided with stub shaft bearings 23 which are adapted to receive the stub shaft 24. This stub shaft 24 is driven directly by means of the gear 25 which is carried by the crank shaft and meshes with a gear 26 mounted upon the stub shaft 24. In addition to the radial bearings 27 and 28, the stub shaft 24 is provided with suitable ball axial thrust bearings 29 (Fig. 1) which serve to absorb the thrust due to the propeller carried at the forward end of the stub shaft. Bearings 27 and 30 are carried by a gear cover 31 which is secured to the main casing 15 by studs 32—and housing all gears and carrying pump 33 as will appear hereinafter.

In order to provide for the operation of the overhead cam shaft 34, the stub shaft 24 is rearwardly extended as at 35 within the crank case to a point approximately midway of the motor where it is provided with a suitable inner bearing 36. This elongation of the shaft also assists to preserve alinement of its front end. The rearward extremity of this stub shaft extension is provided with a suitable bevel gearing 37 which operates the radially divergent hollow shafts 38 (Fig. 3). The shafts 38 are carried by and supported within suitable bearings 39 preferably of the ball type which are supported on the cylindrical extensions 40 of the main aluminum cylinder casting parallel to the cylinder banks (Fig. 3). At their upper extremities, the shafts 38 are provided with a worm 41 engaging a worm wheel 42 which is carried by the hollow overhead cam shaft 34 which lies in the axial plane of the cylinder bank. The stub shaft extension is also provided with the gears 43 which engage gears 44 driving the shaft 45 of the magnetos 46. The magnetos are supported upon suitable bosses 47 which are integrally formed upon the upper crank case casting, one on either side of shafts 38 and in the V between the cylinder banks.

In addition to driving the shaft 24, the gear 25 which is carried upon the crank shaft 19 meshes with a third gear 48 which is carried upon the shaft 49 of the water pump 33. The gear 25 is a herring bone gear and 48 engages one side only. Suitable thrust bearings 50 take up end thrust on gear 48. The shaft 49 of the water pump is also extended rearwardly within the lower half of the crank case casting below oil pan 51 as shown in Fig. 1 where, through a suitable reduction gearing 52, it drives the oil supply pump wholly designated 53. This pump is carried by the lower half of the crank case 54 which lower half constitutes the oil reservoir as usual in this type of motor. It gives it a unique form so that it not only contains the lubricant pump 53 but admits obtaining a better streamline form for the aircraft body within which the motor is carried. This is accomplished by locating the section of maximum depth to the rear of the centerline of the motor and gives the bottom a long gradual upward incline forwardly. The pump is located in this section of maximum depth whereby the return lubricant flows from the ends of the crank case into the base of the pump. The oil draining from the lubricated parts is caught by pan 51 passing to its opposite ends, traverses strainers 55 and conduits 56 to the pump.

Inspection or removal of the pump and stub shaft driving mechanisms, may be carried out by removing gear cover and bearing support 31.

Referring now to Fig. 2 it will be seen that the cylinder construction comprises steel cylinder bodies 57 having thickened and diametrically enlarged explosion chambers 58 at their upper extremities, the head of which explosion chambers is integrally formed with the side walls thereof and is provided with valve seats 59. Exteriorly the explosion chamber is finely threaded as shown at 60 and is screwed fixedly into the aluminum valve cage casting 61 (see Fig. 6). The steel cylinder body 57 is of less exterior diameter than the interior diameter of the aluminum outer walls 17, thereby providing ample annular space 62 for cooling water. This space is large enough to permit of the use of cylinder bodies of different diameters if desired. In this way it is possible to vary the power of the motor by simply utilizing cylinders of different bore, without materially altering any other parts of the motor. At its lower end it is provided with a flange 63 which is adapted to be seated upon suitable packing material 64 such as cork in order to prevent leakage from the annular cooling water space 62 into the crank case 15. The valve cages 61 are one piece castings extending longitudinally of the cylinder banks but formed in sections common each to a multiple number of cylinders, and thereby intertying and reinforcing them by its cantaliver action. Inspection of Figs. 4 and 5 discloses the fact that in this embodiment the valve cage casting retaining the cylinder bodies is formed in two parts. By removing the bolts 65 these sections may be removed as units. Each section at its inner end is enlarged as at 66 to provide a gear case within which the major portion of the worm wheel 42 and worm 41 are inclosed.

Figure 4:
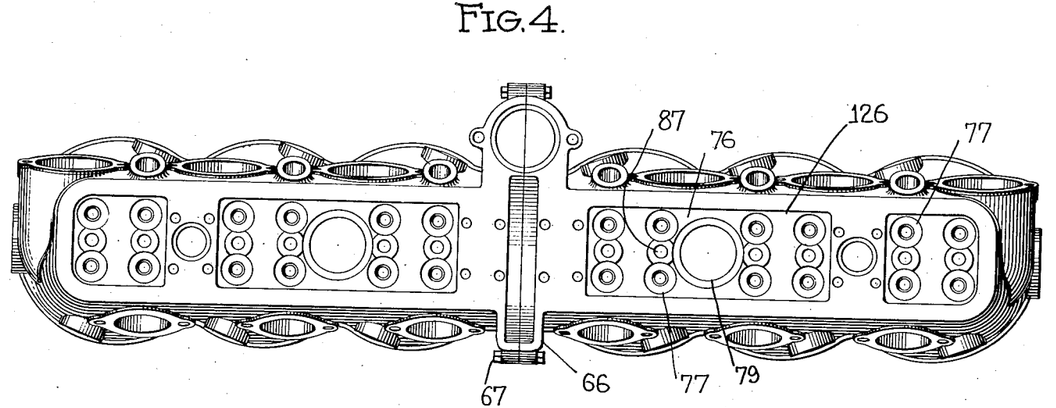
Fig. 4 is a plan view of the valve cage arrangement.
Figure 5:
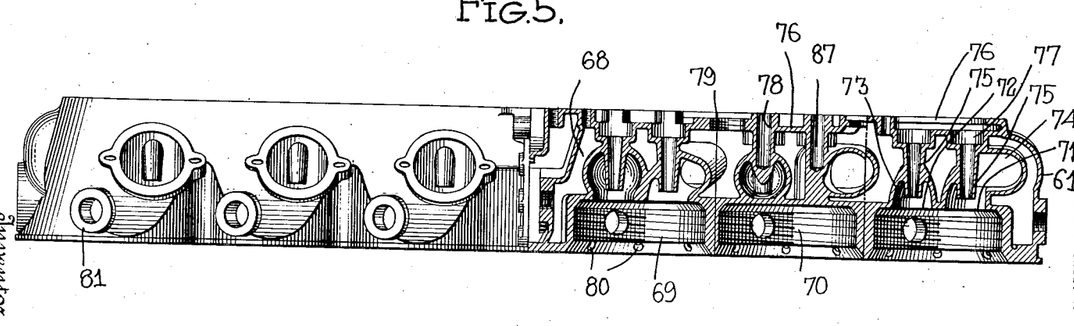
Fig. 5 is a partial sectional elevation of the cage of Fig. 4.
Figure 6:
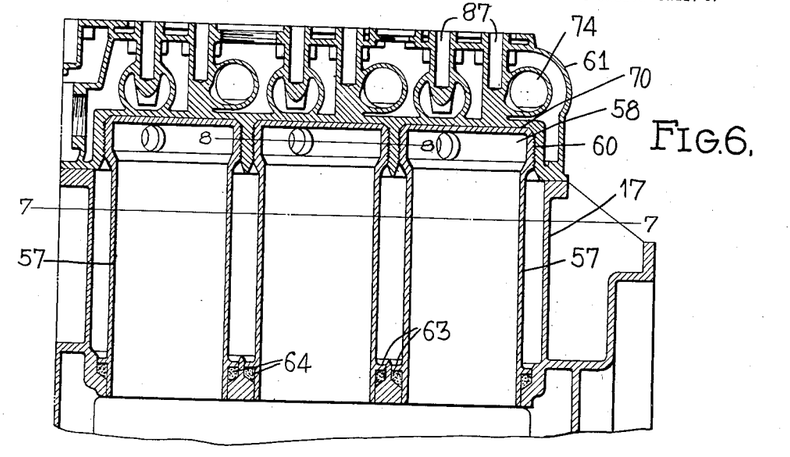
Fig. 6 is a longitudinal section of a group of three cylinders.

Figs. 4 and 5 show in detail the construction of the valve cage casting. Interiorly it is hollow to provide ample cooling water space 68. It is reëntrantly chambered on its bottom as at 69 to contain the heads 58 of the cylinder bodies 57. The inner walls of these chambers are finely threaded as at 70 to take the heads, and the arrangement is such that the heads make a snug fit not only with laterally threaded walls, but also with the tops of the chambers whereby the tops are supported against axial displacement.

Two admission openings 71 and two exhaust openings 72 are provided in the head of each chamber 69, and each pair of openings communicates commonly with admission and exhaust conduits 73 and 74 respectively which pass laterally through the body of the casting to opposite sides thereof where they communicate with admission and exhaust manifolds as presently to be described. The walls of conduits 73 and 74, particularly 74, have free water space on all sides of them. Projecting vertically into the conduits adjacent the openings 71 and 72, valve openings 73 and 74 in actual alinement with valve seats 59 formed in the heads of the cylinder bodies 57, are valve stem guides 75. Their upper ends or mouths are recessed to take valve stem bushings as presently described. The upper face of the casting is rectangularly recessed as at 76 and 77 surrounding one or more sets of valve stem guides 75 and inwardly flanged (see Fig. 5) whereby to provide room for bosses at suitable points, to hold the oil from the valve action, and to take in the flange studs by means of which the bonnet shrouding the valve mechanism is secured to the cage casting. In the axial plane of each pair of admission and exhaust valve openings 71 and 72 is provided a recess 78 to take the cam follower operating the valve. At suitable points openings are provided for access to the interior of the cage casting for removing cores, cleaning the water space, etc. Such are seen at 51ᵃ.

Figure 7:
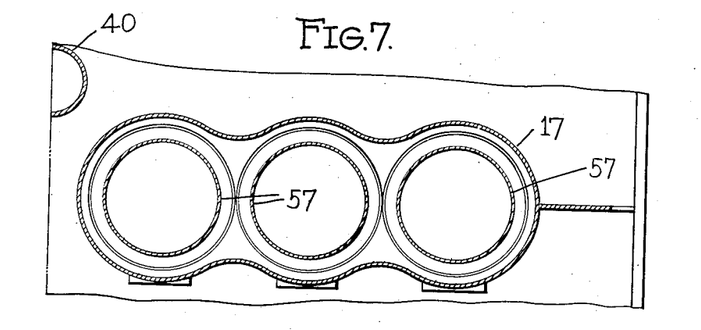
Fig. 7 is a transverse section of same.
Figure 8:
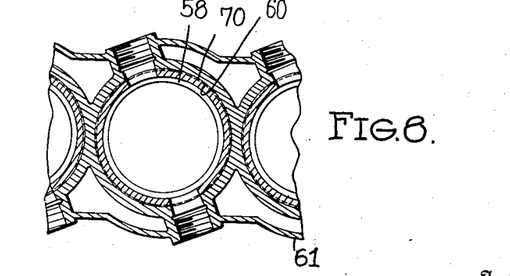
Fig. 8 is a transverse section of the valve cage at the cylinder recess.
Figure 12:
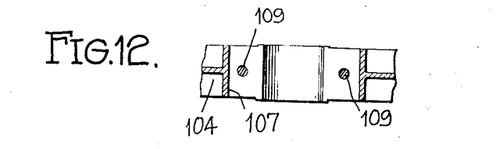
Fig. 12 is a section taken on line 12—12 of Fig. 3.

The cooling water enters the cage casting from the water jacket space between outer cylinder wall 17 and the cylinder body 57 by way of an annular series of holes 80 in the beveled face at the base of the chambers 69, passes around the walls of these chambers and thence freely around the exposed walls of conduits 73 and 74 and valve stem guides 75 and out of the casting through bosses 81 with which connect the branches of the return water conduits 82 (see Figs. 2 and 4). Thus not only the cylinder heads but all the valve cages and conduits are subjected to cooling. The contiguous sections of cage casting 61 may or may not be in interior communication with each other. As appears clearly from Figs. 1, 6 and 7, the cooling water conduits provide entrance and exit openings for circulation by pathways individual to each cylinder, despite the fact that the cylinder bodies are jacketed in groups of three or more multiples.

Turning now to the valve operating mechanism, which mechanism I regard as a highly important feature of my invention, it will be seen that this mechanism is supported in entirety from the top face of the valve cage casting 61. The mechanism for operating each transversely arranged pair of exhaust or admission valves, as shown in the section of Fig. 2, is the same, and hence the description of one pair will suffice for all. Overhead valve actions have been long known to the art, but an overhead action of this character and supported wholly by a bodily removable valve cage casting such as is herein embodied is believed to be wholly new.

Referring to Fig. 2 the bushings 83 are provided with flanges 84 at their upper ends which when bushings 83 are entered in valve stem guides 75, are seated upon the bottoms of the recessed upper ends of the guides. Confined between these flanges 84 and the usual valve stem washers 85 are valve compression springs 86. Confined in this manner the springs are socketed in the upper portions of the recesses 77 and exert such tension as to keep the valves closed except when they are actuated by the cams, against the pressure of the springs. Journaled in the specially provided recesses 78 intermediate each pair of valves, is a T-headed cam follower 87 operating within a suitable bushing 88. The recess 78 is closed at its bottom end, but inasmuch as the stem of the cam follower is hollow there is no dash pot action. The opposite branches of the head of the follower overlie and yoke together respectively the ends of the valve stems of the pair. In axial alinement with the stems each branch of the head is provided with an adjusting screw 89 threaded through its body. The head of the cam follower, like the stem, is also hollowed out, in this case for the sake of lightness. The shanks of these cam followers for each bank of cylinders lie in the same axial plane as the cylinders and overhead cam shaft 34, and the cams 90 of the shaft bear directly upon the heads of the T-followers 87. The cam shaft is supported in bearing 91 borne by suitable studs fixed in the upper face of the valve cage casting 61 (see Fig. 2). The whole mechanism together with the upper portion of the worm gear 42 and the worm 41 are shrouded in a bonnet 92 common to the cylinders of each bank, and enlarged at its central portion to house the worm and worm gear.

Thus is the valve action applied directly to the multiple system of valves with the very minimum number of parts. Not only is weight reduced by this means, but through the arrangement of each cam follower with respect to the pair of valves which it controls there is brought about a symmetry of applied forces and a balanced and intersupported system of parts eliminating irregular strains and stresses and enabling the parts to be made of the very minimum weight. The tests of this motor have more than borne out this state of facts and shown the valve mechanism to be in addition more efficient in action than those more cumbersome types commonly known to practice. These features are covered in a special companion case to be subsequently filed.

Admission manifolds 93 are connected with carbureters 94, one for each group of three cylinders common to a cage casting section by conduits 95. Exhaust conduits are omitted. They may be of any usual form. A water pump 33 feeds the banks of cylinders in common by opposed spiral 96 discharging into manifold conduits 97 connecting with the cylinder banks at points 98 individual to each cylinder body 57. The return water circulation is through bosses 81 and conduits 82 to the radiator (not shown) and back to the inlet of the pump. Ignition circuits from the magnetos (not shown) connect with dual ignition plugs which are threaded into bushings 99 in the valve cage castings and whose beveled ends project through apertures in the combustion chamber 58 of the cylinders 57. These bushings serve to retain the cylinder bodies 47 against rotation in the valve cage casting. Preferably, holes for them are drilled after the cylinder has been flexibly threaded into the valve cage casting.

The openings 100 through which the members 101 pass have their lateral extremities flared. Tapered bushings 102 surrounding the members 101 are forced home against these flared walls to clamp them in place by nuts 103 threaded to the exterior of the members. As clearly appears in Figs. 1 and 3, in the transverse central vertical plane of each bearing 18 is an aluminum webbing 104 rigidly interconnecting the top and side walls of the crank case, the side walls of the main bearing and the other parts specified. The upper half of the main bearing 18 is reinforced by radial webs or ribbing 105 in longitudinally extending planes projecting downwardly from the upper half 106. Certain of these ribs are given a substantial vertical direction to form guideways 107 for the lower half or bearing cap 108 of the main bearing. Studs 109 are threaded into the upper half of the bearing and provided on their sides with nuts 110 and maintain this cap in place. The cap is of a construction previously patented by me and is radially of I-section.

Attention is now directed to Fig. 9 in which is shown the novel method used for retaining the piston pins within the pistons. The piston 111 is provided with the usual piston ring slots 112. At diametrically opposite sides of the piston, inwardly extending bosses 113 are formed. These bosses are drilled interiorly to receive the piston pin 114 which is of such length that it does not extend completely from one side of the piston to the other. That portion of the boss which lies directly at the end of the piston pin is provided with an annular groove 115 into which an annular spring ring 116 is adapted to fit. It may be clearly seen that once the piston pin is inserted and the spring rings are forced into their respective grooves they will assume their expanded position and thus maintain the pin secure within the piston.

The particular construction which is used in attaching the pairs of connecting rods to the common throw of the crank shaft is clearly brought out in Figs. 10 and 11. In this connection one of the rods is substantially straight as usual while the other is provided with a forked end. However, instead of allowing both the plain and the fork ended rods to bear directly upon the crank shaft the plain end 117 of the rod of my construction is provided with a laterally extending integrally formed portion 118 as shown in Fig. 11. This extension is faced both on its inner and outer sides with babbitt, bronze or some similar bearing material 119. The forked connecting rod 120 bears upon the outer surface 121 of this bearing material which is carried by the plain end connecting rod. In this way the maximum unbroken extent of bearing surface is assured for the connecting rods upon the crank shaft and by reason of the construction, maximum lightness is obtained.

The pump 53 drawing the lubricant draining through strainers 55 from the drip pan 51 discharges it into the reservoir 54. It draws the fluid from this reservoir and forces it through conduits 122 to ducts 123 communicating with the main bearing in multiple from conduits 122, also by branches 124 with the stub shaft bearing and by branches 125 with the cam shaft bearing, the drip from which is caught in recesses 126 and lubricates the remainder of the valve mechanism. Return lubricant is drained through duct 127 from the stub shaft bearing to the outer crank shaft bearing and thence to strainer 55, and drained from the upper portion of the valve cage casting by direct return conduits to the upper side of the drip pan.

Although I have described the preferred form of my invention herein, it is to be understood that interpretation of the invention should be made only in view of its generic spirit and that of the claims.

What is claimed is:

1. In an internal combustion engine comprising a crank case, integral extensions of said crank case forming cylinder jacket walls, a valve cage structure removably secured to said jacket walls, and cylinder bodies supported from said valve cage structure and projected within said jacket walls and free from the same whereby space between the cylinder body and the jacket walls is provided for cooling water and the cylinder body is bound to the crank case through the said jacket walls.

2. In an internal combustion engine, a crank-case, a cylinder jacket wall including a fixed part and a removable part, and a cylinder body secured to the removable part of the cylinder jacket wall and projected freely into the space defined by the fixed part thereof.

3. In an internal combustion engine, a crank-case, a cylinder jacket wall including a part integral with the crank-case and a part removable therefrom though fastened to such integral part, and a cylinder body carried by the removable part of the cylinder jacket wall and projected freely into the space defined by the integral part thereof.

4. In an internal combustion engine, a crank-case, a cylinder jacket wall including a fixed part and a removable part, and a removable cylinder body secured to the removable part of the cylinder jacket wall, said removable cylinder body being bodily removable with the removable part of the cylinder jacket wall and after such removal being bodily removable in and of itself.

5. An internal combustion engine comprising a crank case, a jacket wall secured to the crank case, a valve cage structure surmounting the jacket walls and connected therewith, and a cylinder body projecting into the crank case within said jacket walls and secured thereto by way of the valve cage structure.

6. An internal combustion engine comprising a cylinder jacket wall having a removable cylinder supporting structure at one end, and a cylinder body removably carried by said removable structure and projecting within and free of said jacket wall freely to the lower end thereof whereby the cylinder is supported against axial displacement by said jacket wall and an annular water cooling space is formed between the body of the cylinder and said wall.

7. In an internal combustion engine, a crank case, cylinder jacket walls connected directly therewith and inclosing an open space common to a bank of cylinders, a valve cage structure common to the same bank connected with the upper end of said walls, and a bank of cylinder bodies connected with said valve cage structure and projected within the walls freely to the crank case.

8. In an internal combustion engine, a cylinder construction comprising a separable valve cage structure common to a bank of cylinders and secured to the crank case at each cylinder, and a plurality of cylinder bodies secured against axial displacement through common foundation of their upper ends in said valve cage structure.

9. In an internal combustion engine, a unitary cylinder bank structure comprising an elongated valve cage structure, common to a plurality of cylinders and adapted for removable connection with the crank case together with a plurality of cylinder bodies founded in said valve cage structure for removal as a unit therewith.

10. In an internal combustion engine, a crank case, water jacket walls connected therewith, and a cylinder unit comprising a valve cage structure removably connected with the water jacket, and valve mechanism connected with the cage structure and a cylinder body founded in the cage structure and projected within the jacket walls freely to the crank case whereby disconnection of the cage structure from the jacket wall disconnects also the valve mechanism and the cylinder body for removal with it as a unit.

11. In an internal combustion engine, a crank case, a valve cage structure, a cylinder body supported against axial displacement solely by said cage structure, the valve mechanism also carried by said cage structure, and means to removably secure said unit to the crank case independently of the cylinder body.

12. In an internal combustion engine, a bank of cylinders comprising a cage structure common to a plurality of cylinders, cylinder bodies founded in said cage structure independently of each other and supported against axial displacement thereby, and means securing said cage structure to the crank case independently of the cylinders.

13. A cylinder construction for motors comprising a cylinder jacket, a valve cage structure surmounting the jacket and having a transverse cylinder supporting lower wall, a cylinder founded in said wall and projecting within the jacket, water cooling space within said cage on the opposite side of said wall, and an annular series of apertures in said wall between the periphery of the cylinder and the jacket.

14. A cylinder construction comprising a cylinder jacket, a valve cage structure surmounting the jacket and having a chambered lower wall, the cylinders having their heads anchored in said chambers and their exterior walls contiguous to the walls of said chambers but their bodies projecting within but free of said jacket.

15. In a multicylinder internal combustion engine, a crank case member, a plurality of banked cylinders integrally formed therewith, a crank shaft, a main load drive shaft, and a plurality of bearings for the load shaft supported by said crank case member intermediate the respective cylinder banks.

16. In a multicylinder internal combustion engine, a crank case member having a plurality of V-banked cylinders, a crank shaft, bearings for said shaft within said crank case member, a main load drive-shaft, bearings for said drive-shaft superposed above said first mentioned bearings, gearing connections between said drive-shaft and said crank shaft, and a housing for said gearing integrally formed at one extremity of said crank case member.

17. In a multicylinder internal combustion engine having its cylinders banked in V-form, a crank case, a main drive shaft located substantially in the V of said banks of cylinders and mounted in bearings contained in the crank-case, a cam shaft supported at the top of each bank of cylinders, and means for driving the cam shafts from said main drive shaft.

18. A crank case for an internal combustion engine comprising an upper section having a plurality of V-banked cylinders carried thereby, a drive shaft bearing located substantially within the V of said cylinders, a crank case web supporting said bearing, and a crank shaft bearing supported by the same web substantially beneath said drive shaft bearing.

19. In a multi-cylinder internal combustion engine, in combination, a crank case and water jacket walls for the cylinders carried thereby, a valve cage unit removably connected with the upper ends of said cylinders and carried thereby, said cage having a plurality of jackets on its under side in register with the jacket walls, and a plurality of cylinder bodies having their upper ends expanded to form enlarged combustion chambers, the enlarged ends of said cylinders being founded in said jackets and the constricted portions of the cylinder bodies being spaced from the jacket walls throughout the piston travel.

20. In a multi-cylindered internal engine in combination, a crank case, water jacket walls for the cylinders and a valve cage unit carried by said crank case, said cage having a plurality of jackets on its under side and a plurality of cylinder bodies having their upper ends expanded to form enlarged combustion chambers, the enlarged ends of such chambers being founded in the valve cage jackets and the constricted portions of the cylinder bodies being spaced from the water jacket walls throughout the piston travel.

In testimony whereof I hereunto affix my signature.

CHARLES B. KIRKHAM.